(12) United States Patent
Gulati et al.

(10) Patent No.: US 7,912,062 B2
(45) Date of Patent: Mar. 22, 2011

(54) METHODS AND APPARATUS FOR MANAGING ADDRESSES RELATED TO VIRTUAL PARTITIONS OF A SESSION EXCHANGE DEVICE

(75) Inventors: Aman Gulati, Falls Church, VA (US); Paritosh Tyagi, Germantown, MD (US)

(73) Assignee: Genband US LLC, Plano, TX (US)

( * ) Notice: Subject to any disclaimer, the term of this patent is extended or adjusted under 35 U.S.C. 154(b) by 170 days.

(21) Appl. No.: 11/864,206

(22) Filed: Sep. 28, 2007

(65) Prior Publication Data

US 2009/0086728 A1    Apr. 2, 2009

(51) Int. Cl.
*H04L 12/28* (2006.01)
*H04L 12/56* (2006.01)
*H04J 3/16* (2006.01)
*H04J 3/22* (2006.01)
*G06F 15/16* (2006.01)
*G06F 15/173* (2006.01)

(52) U.S. Cl. .................. 370/392; 370/395.2; 370/395.3; 370/395.52; 370/409; 370/469; 709/227; 709/238

(58) Field of Classification Search .................. 370/392, 370/395.2, 395.3, 395.52, 409, 469; 709/227, 709/238
See application file for complete search history.

(56) References Cited

U.S. PATENT DOCUMENTS

| | | | |
|---|---|---|---|
| 5,796,424 A | 8/1998 | Ely et al. | |
| 6,738,813 B1 | 5/2004 | Reichman | |
| 6,775,269 B1 | 8/2004 | Kaczmarczyk et al. | |
| 6,775,280 B1 | 8/2004 | Ma et al. | |
| 6,895,429 B2 | 5/2005 | Banga et al. | |
| 6,904,017 B1 | 6/2005 | Meempat et al. | |
| 6,944,678 B2 | 9/2005 | Lu et al. | |
| 6,980,526 B2 | 12/2005 | Jang et al. | |
| 7,002,973 B2 | 2/2006 | MeLampy et al. | |
| 7,028,092 B2 | 4/2006 | MeLampy et al. | |

(Continued)

FOREIGN PATENT DOCUMENTS

EP    1 043 648 A2    10/2000

(Continued)

OTHER PUBLICATIONS

Notification of Transmittal of the International Search Report and the Written Opinion of the International Searching Authority, or the Declaration for International Application No. PCT/US2008/077987 (Jul. 14, 2009).

(Continued)

*Primary Examiner* — Alpus H Hsu
*Assistant Examiner* — Saad Hassan
(74) *Attorney, Agent, or Firm* — Jenkins, Wilson, Taylor & Hunt, P.A.

(57) ABSTRACT

In one embodiment, a method includes receiving an IP packet associated with a first virtual partition defined at a session exchange device. The first virtual partition is associated with a first IP address space. The method also includes receiving an IP packet associated with a second virtual partition defined at the session exchange device. The second virtual partition is associated with a second IP address space having a portion that corresponds with the first IP address space. The IP packet associated with the first virtual partition is modified such that the IP packet associated with the first virtual partition has an IP address value from a third IP address space different from the portion of the second IP address space.

20 Claims, 7 Drawing Sheets

U.S. PATENT DOCUMENTS

| | | | |
|---|---|---|---|
| 7,031,311 | B2 | 4/2006 | MeLampy et al. |
| 7,058,974 | B1 | 6/2006 | Maher, III et al. |
| 7,072,303 | B2 | 7/2006 | MeLampy et al. |
| 7,133,923 | B2 | 11/2006 | MeLampy et al. |
| 7,142,532 | B2 | 11/2006 | Penfield et al. |
| 7,151,781 | B2 | 12/2006 | MeLampy et al. |
| 7,193,996 | B2 | 3/2007 | Dobbins et al. |
| 7,260,085 | B2 | 8/2007 | Dobbins et al. |
| 7,362,707 | B2 | 4/2008 | MeLampy et al. |
| 7,376,731 | B2 | 5/2008 | Khan et al. |
| 7,433,315 | B2 | 10/2008 | Bhatia et al. |
| 7,447,160 | B1 | 11/2008 | Croak et al. |
| 7,466,710 | B1 | 12/2008 | Clemm et al. |
| 7,483,380 | B2 | 1/2009 | Metke |
| 2001/0033551 | A1 | 10/2001 | Busuioc et al. |
| 2002/0024954 | A1 | 2/2002 | Cunetto et al. |
| 2002/0087689 | A1 | 7/2002 | Chen |
| 2002/0087721 | A1* | 7/2002 | Sato et al. .................. 709/238 |
| 2003/0005152 | A1 | 1/2003 | Diwan et al. |
| 2003/0072271 | A1 | 4/2003 | Simmons et al. |
| 2003/0161310 | A1 | 8/2003 | Dobbins et al. |
| 2003/0186702 | A1 | 10/2003 | McConnell et al. |
| 2003/0225893 | A1 | 12/2003 | Roese et al. |
| 2004/0015583 | A1 | 1/2004 | Barrett et al. |
| 2004/0025186 | A1 | 2/2004 | Jennings et al. |
| 2004/0044871 | A1 | 3/2004 | Weber et al. |
| 2004/0066782 | A1 | 4/2004 | Nassar |
| 2004/0086093 | A1 | 5/2004 | Schranz |
| 2004/0109541 | A1 | 6/2004 | Celi et al. |
| 2004/0117624 | A1 | 6/2004 | Brandt et al. |
| 2004/0128201 | A1 | 7/2004 | Ofir et al. |
| 2004/0213210 | A1 | 10/2004 | Dube et al. |
| 2004/0218614 | A1 | 11/2004 | Yokomitsu et al. |
| 2004/0250114 | A1 | 12/2004 | Parekh et al. |
| 2005/0111382 | A1 | 5/2005 | Le et al. |
| 2005/0111455 | A1* | 5/2005 | Nozue et al. .................. 370/392 |
| 2005/0147031 | A1 | 7/2005 | Bhatia et al. |
| 2005/0213591 | A1 | 9/2005 | Nakazawa et al. |
| 2005/0265231 | A1 | 12/2005 | Gunther et al. |
| 2006/0088025 | A1 | 4/2006 | Barkley et al. |
| 2006/0098577 | A1 | 5/2006 | MeLampy et al. |
| 2006/0126664 | A1 | 6/2006 | Horton |
| 2006/0147013 | A1 | 7/2006 | Baumeister et al. |
| 2006/0187927 | A1 | 8/2006 | MeLampy et al. |
| 2006/0187942 | A1 | 8/2006 | Mizutani et al. |
| 2006/0215683 | A1 | 9/2006 | Sukkar et al. |
| 2006/0245574 | A1 | 11/2006 | Phelps et al. |
| 2007/0019619 | A1 | 1/2007 | Foster et al. |
| 2007/0036151 | A1 | 2/2007 | Baeder |
| 2007/0058639 | A1 | 3/2007 | Khan |
| 2007/0076591 | A1 | 4/2007 | Khan |
| 2007/0076594 | A1 | 4/2007 | Khan et al. |
| 2007/0076603 | A1 | 4/2007 | MeLampy et al. |
| 2007/0076710 | A1 | 4/2007 | Khan |
| 2007/0076855 | A1 | 4/2007 | MeLampy et al. |
| 2007/0104105 | A1 | 5/2007 | MeLampy et al. |
| 2007/0116043 | A1 | 5/2007 | MeLampy et al. |
| 2007/0180080 | A1 | 8/2007 | Mallesan et al. |
| 2007/0180124 | A1 | 8/2007 | Mallesan et al. |
| 2007/0180141 | A1 | 8/2007 | Mallesan |
| 2007/0180142 | A1* | 8/2007 | Small et al. .................. 709/245 |
| 2007/0201472 | A1 | 8/2007 | Bhatia et al. |
| 2007/0201473 | A1 | 8/2007 | Bhatia et al. |
| 2007/0201481 | A1 | 8/2007 | Bhatia et al. |
| 2007/0201494 | A1* | 8/2007 | Lou et al. .................. 370/401 |
| 2007/0263660 | A1* | 11/2007 | Mitsumori .................. 370/469 |
| 2008/0101343 | A1* | 5/2008 | Monette et al. .................. 370/352 |
| 2008/0159294 | A1* | 7/2008 | Irish et al. .................. 370/392 |
| 2008/0285569 | A1* | 11/2008 | Stademann et al. ..... 370/395.31 |
| 2009/0046720 | A1* | 2/2009 | Streijl et al. .................. 370/394 |

FOREIGN PATENT DOCUMENTS

| | | |
|---|---|---|
| JP | 2004193845 A | 7/2004 |
| WO | WO 02/49279 A2 | 6/2002 |
| WO | WO 02/49315 A2 | 6/2002 |
| WO | WO 02/49316 A2 | 6/2002 |
| WO | WO 02/058349 | 7/2002 |
| WO | WO 02/060116 A2 | 8/2002 |

OTHER PUBLICATIONS

Interview Summary for U.S. Appl. No. 11/537,329 (Mar. 1, 2010).
Interview Summary for U.S. Appl. No. 11/537,345 (Feb. 5, 2010).
Interview Summary for U.S. Appl. No. 11/343,212 (Jan. 26, 2010).
Final Official Action for U.S. Appl. No. 11/343,211 (Dec. 18, 2009).
Final Official Action for U.S. Appl. No. 11/343,212 (Dec. 18, 2009).
Final Official Action for U.S. Appl. No. 11/343,218 (Nov. 13, 2009).
Official Action for U.S. Appl. No. 11/537,345 (Nov. 3, 2009).
Interview Summary for U.S. Appl. No. 11/343,212 (Oct. 1, 2009).
Official Action for U.S. Appl. No. 11/537,316 (Sep. 25, 2009).
Official Action for U.S. Appl. No. 11/537,329 (Sep. 18, 2009).
Interview Summary for U.S. Appl. No. 11/343,218 (Jul. 22, 2009).
Official Action for U.S. Appl. No. 11/343,218 (Mar. 18, 2009).
Official Action for U.S. Appl. No. 11/343,212 (Mar. 13, 2009).
Official Action for U.S. Appl. No. 11/537,345 (Mar. 4, 2009).
Official Action for U.S. Appl. No. 11/343,211 (Mar. 4, 2009).
Official Action for U.S. Appl. No. 11/537,329 (Feb. 20, 2009).
Official Action for U.S. Appl. No. 11/537,316 (Feb. 20, 2009).
Tyson et al., "How VoIP Works," Dockitmoto, http://computer.howstuffworks.com/ip-telephony.htm/printable (Downloaded from the Internet on Jan. 19, 2006).
"NexTone Products," http://www.nextone.com/pages/products/product.htm, (Copyright 2005) (Downloaded from the Internet on Jan. 19, 2006).
"Session Border Controller," http://www.yenra.com-session-border-controller/, p. 1 (Oct. 18, 2004).
Liu et al., "WSIP—Web Service SIP Endpoint for Converged Multimedia/Multimodal Communication over IP," IEEE International Conference on Web Services (ICWS'04), pp. 1-8 (Jul. 6-9, 2004).
Hayes, "IP Based Multimedia Services Platform," Ericsson, ITU-T IMT-2000 and Beyond, pp. 1-19 (May 28, 2002).
Smiljanić, "Flexible Bandwidth Allocation in High-Capacity Packet Switches," IEEE/ACM Transactions on Networking, vol. 10, No. 2, pp. 287-293 (Apr. 2002).
"Session Admission Control: Interactive Communication SLAs over Skinny Pipes," Acme Packet, Inc., pp. 1-14 (Copyright 2002).
Notice of Allowance and Fee(s) Due for U.S. Appl. No. 11/343,218 (Sep. 8, 2010).
Notice of Allowance and Fee(s) Due for U.S. Appl. No. 11/343,211 (Sep. 7, 2010).
Notice of Allowance and Fee(s) Due for U.S. Appl. No. 11/343,212 (Sep. 7, 2010).
Official Action for U.S. Appl. No. 11/343,212 (Apr. 28, 2010).
Interview Summary for U.S. Appl. No. 11/343,212 (Aug. 3, 2010).

* cited by examiner

300

| External Address Space 310 | Virtual Partition Identifier 320 | External Address Value 330 | Internal Address Value 340 | Internal Address Space 350 |
|---|---|---|---|---|
| A through B | Z-100 | A | G | G through Q |
| | | B | H | |
| A through B | Z-200 | A | I | |
| | | B | J | |
| B through D | Z-300 | B | K | |
| | | C | L | |
| | | D | M | |

FIG. 3

METHODS AND APPARATUS FOR MANAGING ADDRESSES RELATED TO VIRTUAL PARTITIONS OF A SESSION EXCHANGE DEVICE

BACKGROUND

One or more embodiments of the invention relate generally to address translation, including, for example, methods and apparatus for translating an internet protocol (IP) address value of a packet associated with a session exchange device.

A network address translation (NAT) device can be configured to translate an IP address of a packet from an address space associated with a network into an address space associated with a different network. Known NAT devices, however, are not currently configured to translate an IP address of a packet from an address space associated with a network into an address space associated with a portion of a device such as a session exchange device. Furthermore, known NAT devices are not currently configured to translate an IP address of a packet from an address space associated with a virtual partition defined at a session exchange device into a different address space. Thus, a need exists for methods and apparatus for translating an IP address value of a packet associated with a session exchange device.

SUMMARY OF THE INVENTION

In one embodiment, a method includes receiving an IP packet associated with a first virtual partition defined at a session exchange device. The first virtual partition is associated with a first IP address space. The method also includes receiving an IP packet associated with a second virtual partition defined at the session exchange device. The second virtual partition is associated with a second IP address space having a portion that corresponds with the first IP address space. The IP packet associated with the first virtual partition is modified such that the IP packet associated with the first virtual partition has an IP address value from a third IP address space different from the portion of the second IP address space.

BRIEF DESCRIPTION OF THE DRAWINGS

FIG. 3 shows a table that illustrates the relationship between internal IP address values and external IP address values, according to an embodiment of the invention.

DETAILED DESCRIPTION

Figure 1:
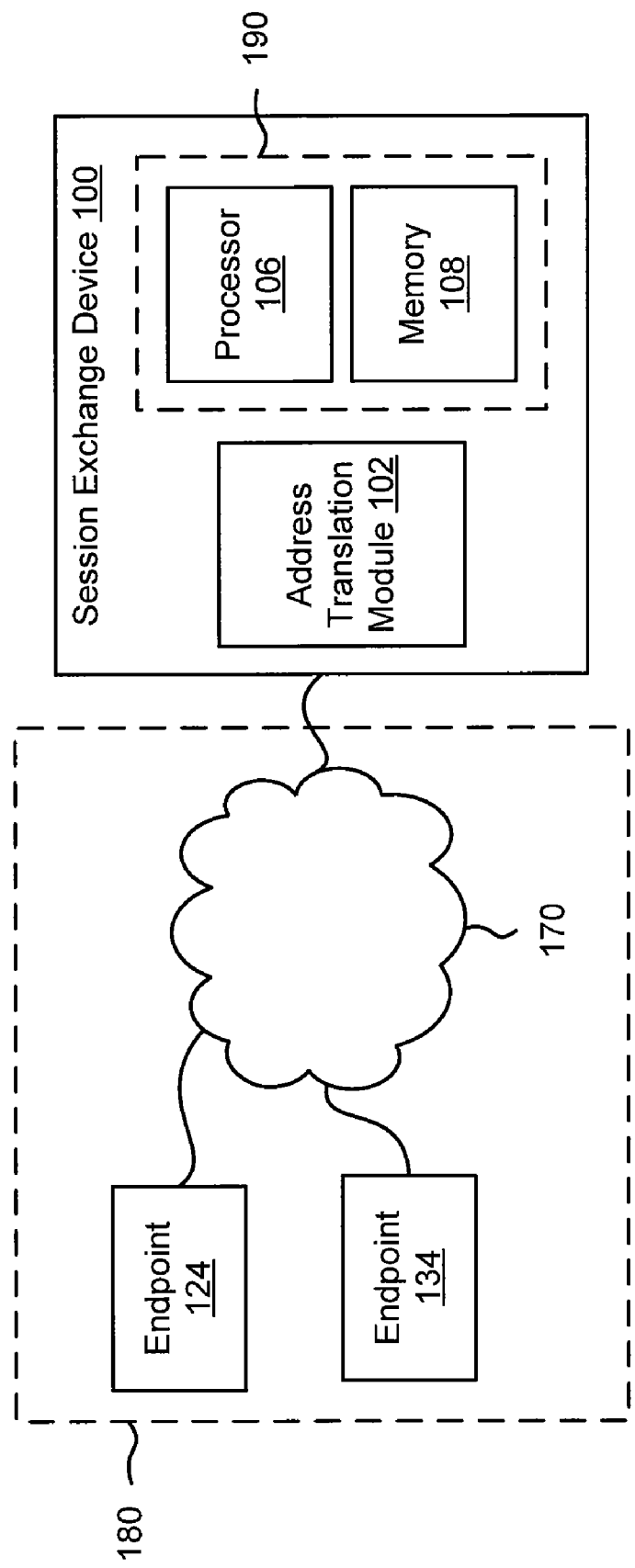
FIG. 1 is a schematic block diagram that illustrates an address translation module of a session exchange device configured to translate an internet protocol (IP) address value of a packet with a different IP address value, according to an embodiment of the invention.

A session exchange device within a media over Internet Protocol (MoIP) network can have an address translation module configured to translate an internet protocol (IP) address value included in a packet into a different IP address value. Translating an IP address value can include determining a new IP address value and/or replacing (e.g., changing) the IP address value with the new IP address value. For example, an IP address value of a packet received at a session exchange device can be replaced with a different IP address value before the packet is processed at the session exchange device. In some embodiments, the address translation module can be configured to determine whether or not the IP address value should be replaced. The IP address value can be included in any portion of a packet such as, for example, a header portion and/or a payload portion of the packet.

The IP address values of packets received at and/or transmitted (e.g., sent) from the session exchange device can be translated so that network processing external (e.g., substantially external) to the session exchange device and network processing internal to the session exchange device can be based on one or more different IP address spaces. Network processing, which can be referred to as network-related processing, can include, for example, any type of processing based on an IP address value (e.g., processing related to network communications). An IP address space defines a range of discrete IP address values that can be associated with, for example, a physical entity and/or a virtual entity (e.g., a network interface, a virtual partition). IP address values used for network processing outside of the session exchange device can be referred to as external IP address values or public IP address values, and IP address values used for network processing within the session exchange device can be referred to as internal IP address values or private IP address values.

In some embodiments, a session exchange device can have an address translation module configured to intercept and translate IP address values of packets associated with one or more virtual partitions (e.g., virtual local area networks (VLANs), realms) defined at the session exchange device. IP address values of the packets can be translated so that processing within the session exchange device can be substantially based on unique IP address values even when two or more virtual partitions defined at the session exchange device are associated with overlapping IP address spaces. The IP address value of a packet associated with a virtual partition can be translated based on an identifier associated with that virtual partition. The identifier associated with the virtual partition can be referred to as a virtual partition identifier. For example, an ingress packet that has an external IP address value from an IP address space associated with a virtual partition can be received at a session exchange device. The external IP address value of the packet can be replaced with an internal IP address value based on an identifier associated with the virtual partition before the packet is processed at a portion of an operating system of the session exchange device.

In some embodiments, the packet can be a formatted block of data configured to be transmitted over a computer network (e.g., an IP packet, a session control packet, or an address resolution protocol (ARP) packet). In some embodiments, an address translation module can be associated with an operating system of a session exchange device or a module associated with an application of the session exchange device. A MoIP network can be, for example, a voice over internet protocol (VoIP) network and/or a session over internet protocol (SoIP) network.

FIG. 1 is a schematic block diagram that illustrates an address translation module 102 of a session exchange device 100 configured to translate an IP address value of a packet into a different IP address value, according to an embodiment of the invention. The address translation module 102 of the session exchange device 100 is configured to translate the IP address value of the packet when the packet is sent from an external network-processing region 180 to an internal network-processing region 190, and vice versa. The internal network-processing region 190 can include, for example, a processor 106 and/or a memory 108.

The external network-processing region 180 is a region where network processing is based on external IP address values from an external IP address space (e.g., public IP address space). The network processing region 180 is external to the session exchange device 100. In some embodiments, a portion of the session exchange device 100 can be associated with the network processing region 180. As shown in FIG. 1, network 170, endpoint 124, and endpoint 134 are associated with the external network-processing region 180. Network processing includes, for example, processing based on an IP address value such as routing of a packet based on the IP address value or binding of devices/sockets to the IP address value. In some embodiments, the routing can be performed by, for example, processors, routers, and/or bridges (not shown) within network 170.

The internal network-processing region 190 is a region where network processing related to packets is based on internal IP address values from an internal IP address space (e.g., private IP address space). As shown in FIG. 1, the internal network-processing region 190 is internal to the session exchange device 100. The external IP address space and the internal IP address space, in this embodiment, are different. In some embodiments, all of the external IP address values in the external IP address space can be different than all of the internal IP address values in the internal IP address space. In some embodiments the external IP address space and the internal IP address space can have some overlap.

When the packet is sent from the external network-processing region 180 to the internal network-processing region 190, the IP address value of the packet can be translated (e.g., changed) by the address translation module 102 from an external IP address value from the external IP address space to an internal IP address value from the internal IP address space. For example, an ingress packet received at the session exchange device 100 from the external processing region 180 can have an external IP address value from an external IP address space associated with the external processing region 180. The external IP address value can be replaced with an internal IP address value from an internal IP address space associated with the internal network-processing region 190 at the address translation module 102 so that the packet can be processed at the internal network-processing region 190 based on the internal IP address value.

Similarly, when the packet is sent from the internal network-processing region 180 to the external network-processing region 190, the IP address value of a packet can be translated (e.g., changed) by the address translation module 102 from an internal IP address value from the internal IP address space to an external IP address value from the external IP address space. For example, after network processing at the internal network-processing region 190 is completed, but before a packet is transmitted from the session exchange device 100 as an egress packet, an internal IP address value of the packet can be replaced at the address translation module 102 with an external IP address value from the external IP address space. In some embodiments, a packet with an external IP address value may be incompatible with a protocol associated with the internal network-processing region 190 and/or a packet with an internal IP address value may be incompatible with a protocol associated with the external network-processing region 180.

In some embodiments, the address translation module 102 can function as a translation module disposed in a pipeline between the external network-processing region 180 and the internal network-processing region 190 of the session exchange device 100. In some embodiments, the address translation module 102 can be configured to translate the IP address values of packets associated with specified layers of the open systems interconnection (OSI) model. For example, if the internal network-processing region 190 is associated with an operating system of the session exchange device 100, the address translation module 102 can be configured to translate the IP address values of packets associated with layer-4 of the OSI model and below.

In some embodiments, the address translation module 102 can be configured to replace address values associated with packets in a desirable fashion by referencing an address translation database (not shown) that includes translation information. In some embodiments, the address translation module 102 can be configured to define translation information entries within the address translation database. In some embodiments, the address translation database can be stored in a memory local to the session exchange device 100 or stored in remote memory that can be accessed by the session exchange device 100. More details related to an address translation database are discussed in connection with FIG. 3.

The network 170 can be a wireless network and/or a wired network configured to transmit data and/or media content such as voice content and/or video content. For example, portions of the network 170 can be used for MoIP sessions such as VoIP sessions. Endpoint 124 and/or endpoint 134 can be, for example, a public switched telephone network (PSTN), a broadband network that can provide network access to broadband consumers, an enterprise network, an H.323 network, a session initiation protocol (SIP) softswitch network, or a SIP network. Endpoint 124 and/or endpoint 134 can alternatively be an individual phone/computer terminal or an access point (e.g., another SBC) to another MoIP network. Of course, endpoint 124 and/or endpoint 134 can be a source endpoint and/or a destination endpoint that includes any combination of the above examples.

In some embodiments, the session exchange device 100 can be, for example, a multi-protocol session exchange device configured to operate as a session border controller (SBC) for the network 170. Any portion of the session exchange device 200 can be defined using software modules and/or hardware modules. In some embodiments, the session exchange device 100 can be a session-aware device configured to, for example, modify routing of a media signal using, OSI layer-5 parameters (e.g., call admission control (CAC)-related parameters, session layer parameters) and/or OSI layer-3 parameters.

Figure 2:
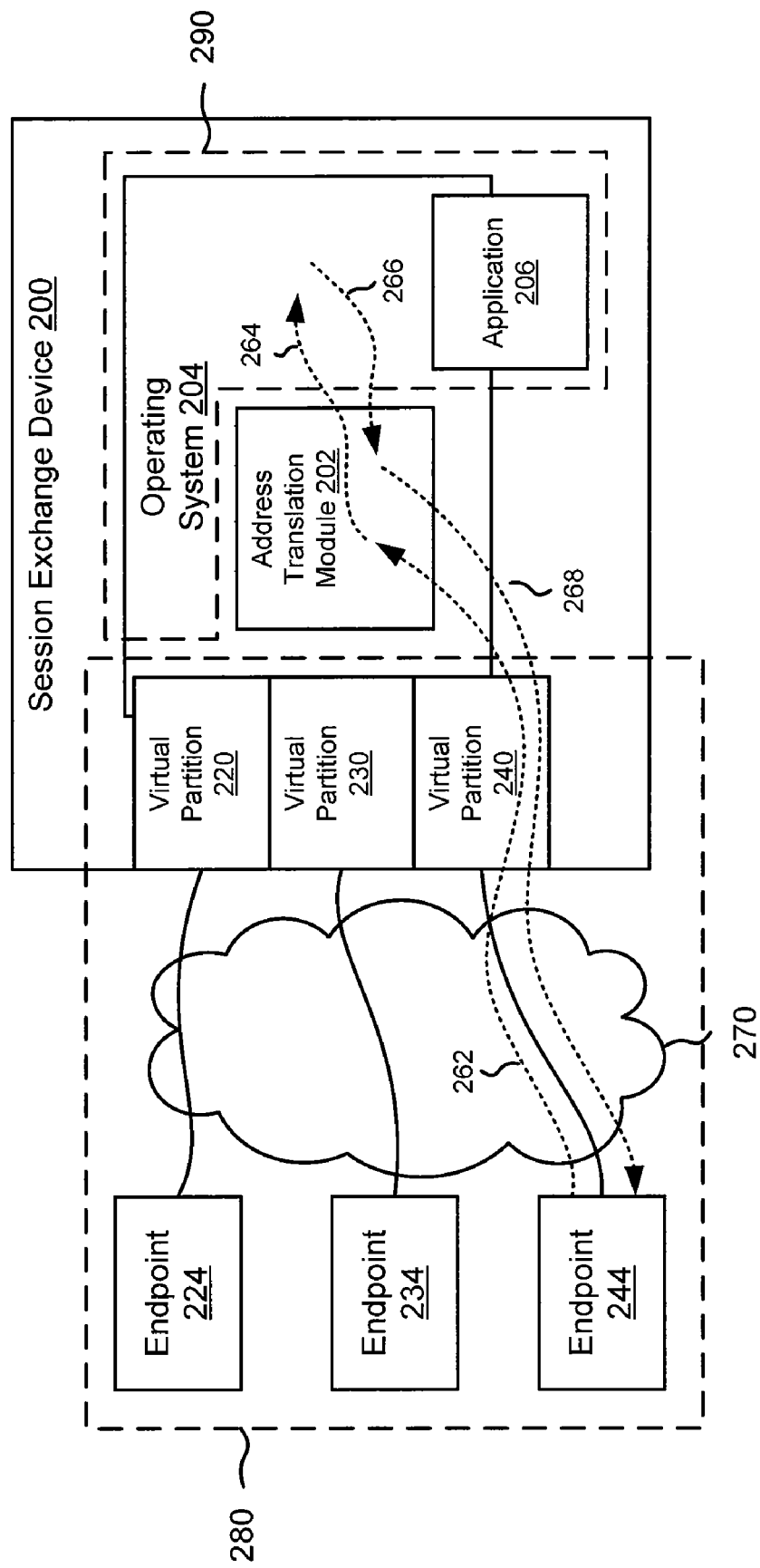
FIG. 2 is a schematic block diagram that illustrates an address translation module of a session exchange device configured to translate an IP address value of a packet when transmitted between an external network-processing region and an internal network processing region, according to an embodiment of the invention.

FIG. 2 is a schematic block diagram that illustrates an address translation module 202 of a session exchange device 200 configured to translate an IP address value of a packet when transmitted between an external network-processing region 280 and an internal network-processing region 290, according to an embodiment of the invention. The session exchange device 200 has three virtual partitions—virtual partition 220, virtual partition 230, and virtual partition 240. The virtual partitions 220, 230, and 240 are associated with endpoints 224, 234, and 244, respectively. The virtual partitions 220, 230, and/or 240 are independent logical networks (e.g., virtual partition, independent network segments) defined at the session exchange device 200 and can be, for example, VLANs that can have more than one realm. More details related to virtual partitions and realms are set forth in co-pending application Ser. No. 11/323,211, "Method and Apparatus for Partitioning Resources within a Session-Over-Internet-Protocol (SoIP) Session Controller," which is incorporated herein by reference in its entirety. As shown in FIG. 2, at least a portion of the operating system 204 and an application 206 are associated with the internal network-processing region 290.

In this embodiment, each of the virtual partitions 220, 230, and 240 is associated with an identical external IP address space. Consequently, separate packets can be processed at the external network-processing region 280 based on the same external IP address value from the external IP address space regardless of their association with a particular virtual partition (e.g., associated with virtual partition 230). Moreover, because the external IP address spaces of the virtual partitions 220, 230, and 240 are identical, more than one of the virtual partitions 220, 230, and 240 of the session exchange device 200 can be identified as a destination using a single IP address value. For example, a first packet can be routed to virtual partition 220 from endpoint 224 over network 270 based on an external IP address value, and a second packet can be routed to virtual partition 230 from endpoint 234 over network 270 using the same external IP address value.

The address translation module 202 is configured to replace the external IP address values of at least some of the ingress packets associated with the virtual partitions 220, 230, and 240 with internal IP address values before the ingress packets are processed at the internal network-processing region 290. The internal IP address values can be from an internal IP address space associated with the internal network-processing region 290. The external IP address values can be replaced so that network processing associated with each of the ingress packets can be performed based on an internal IP address value unique to the internal network-processing region 290.

The external IP address values can be replaced with an internal IP address value unique to the internal network-processing region 290 based on a virtual partition identifier (e.g., a VLAN identifier associated with virtual partition 220) and the external IP address value. The external IP address value and the virtual partition identifier can both be included in at least a portion of the ingress packet. The external IP address values are replaced to avoid network processing collisions within the internal network-processing region 290 when separate ingress packets associated with different virtual partitions 220 have the same external IP address value.

For example, an ingress packet having an external IP address value can be received (shown as line 262) at the address translation module 202 of the session exchange device 200 via virtual partition 240. The external IP address value of the packet can be replaced at the address translation module 202 with an internal IP address value and forwarded (shown as line 264) to the internal network-processing region 290 as a packet having an internal IP address value. The external IP address value can be replaced with the internal IP address value based on an identifier associated with virtual partition 240 and the external IP address value included in the ingress packet. More details related to determining an internal IP address value based on a virtual partition identifier and an external IP address value are discussed in connection with FIG. 3.

In some embodiments, an external IP address value included in an ingress packet, such as the ingress packet received via virtual partition 240 (shown as line 262), can be replaced by an internal IP address value selected from an internal IP address space based on one or more rules such as a network address translation (NAT) rule. The internal IP address space can be based on IP address values that cannot be used for routing over a network such as network 270. For example, the IP address values can be from a reserved or a private IP address space (e.g., an IP address value from 169.254.X.X).

After a packet has been processed at the internal network-processing region 290, the address translation module 202 can be configured to replace the internal IP address value of the packet with an external IP address value. The internal IP address value can be replaced just before the packet is transmitted from the session exchange device 200 via one of the virtual partitions 220, 230, or 240.

For example, after the packet with the internal IP address value has been received at (shown as line 264) and processed at a portion of the operating system 204 of the internal network-processing region 290, the packet can be sent (shown as line 266) to the address translation module 202. The internal IP address value of the packet can be replaced with an external IP address value and transmitted (shown as line 268) from the session exchange device 200 as an egress packet via virtual partition 240. In some embodiments, the egress packet can be transmitted from the session exchange device 200 via any one of the virtual partitions 220, 230, or 240.

The external IP address value can be determined based on an internal IP address value and/or a virtual partition identifier (e.g., a virtual partition identifier associated with virtual partition 220). In some embodiments, the internal IP address value can be replaced with the same external IP address value included in the packet before the packet was processed at the internal network-processing region 290. More details related to determining an external IP address value based on a virtual partition identifier and/or the external IP address value are discussed in connection with FIG. 3.

Although in this embodiment each of the virtual partitions 220, 230, and 240 were associated with the same external IP address space, in some embodiments, the virtual partitions 220, 230 and/or 240 can be associated with different external IP address spaces. For example, only a portion of an external IP address space associated with virtual partition 220 can overlap with an external IP address space associated with virtual partition 230. The overlap in external IP address space can be referred to as a shared external IP address space. In some embodiments, an internal IP address value of an egress packet can be replaced at the address translation module 202 with an external IP address space associated with any of the virtual partitions 220, 230, and 240 before the egress packet is transmitted from the session exchange device 200.

In some embodiments, the address translation module 202 can be configured to replace an external IP address value of, for example, an ingress packet if the external IP address value is from a shared portion of an external IP address space. Accordingly, the address translation module 202 can be configured to determine that the IP address value of the packet is from the shared portion of the external IP address space before replacing the IP address value. In some embodiments, the address translation module 202 can be configured to send (e.g., forward) an ingress packet without replacing an external IP address value of the packet if the address translation module 202 determines that an external IP address value of the ingress packet is from an unshared portion of an external IP address space.

Each of the endpoints 224, 234, and 244 are shown as being in communication with the virtual partitions 220, 230, and 240, respectively, of session exchange device 200 via different connections. In some embodiments, the endpoints 224, 234, and/or 244 can be connected to the session exchange device 200 via one or more physical and/or logical input/output (I/O) ports (not shown).

In some embodiments, the application 206 can have an address translation module (not shown) separate from address translation module 202. The address translation module of the application 206 can be configured to translate IP address values of packets in a fashion similar to that of the address translation module 202. In other words, the address translation module of the application 206 can have the same or substantially similar functionality to that of the address translation module 202.

In some embodiments, the address translation module of the application 206 can be configured to translate an internal IP address value and/or an external IP address value of a packet when the packet is associated with layer-5 of the OSI model and above (e.g., session layer packets and above). In some embodiments, the address translation module of the application 206 can be configured to translate an internal IP address value and/or an external IP address value associated with a portion of a packet that is not processed and/or defined by the operating system 204 and/or the address translation module 202 (e.g., a layer-5 payload of a packet).

In some embodiments, the address translation module 202 and the address translation module 206 of the application can be configured to access the same address translation database (not shown). The address translation database can be, in some embodiments, defined and/or maintained by the address translation module 202. In some embodiments, the internal network-processing region 290 has one or more logical partitions that are not associated with the virtual partitions 220, 230, and/or 240. For example, a logical partition of the internal network-processing region 290 may not be uniquely associated with any one of the virtual partitions 220, 230, and/or 240.

FIG. 3 shows a table 300 that illustrates the relationship between internal IP address values and external IP address values, according to an embodiment of the invention. The table 300 is associated with a session exchange device that has multiple virtual partitions such as that shown in FIG. 2. Each virtual partition has a virtual partition identifier 320 and is associated with an external address space 310. In some embodiments, the table 300 can be referred to as an address translation database.

For example, virtual partition Z-300 is associated with an external address space 310 that includes external address values B, C and D (column 330). All of the virtual partitions in this table 300 have at least one overlapping external address value 330. For example, both virtual partition Z-100 and virtual partition Z-300 have external address value B (column 330). Although internal address space 350 includes internal address values G through Q, only internal address values G through M are shown in column 340.

As shown in table 300, each of the external address values 330 can be associated with an internal address value 340 that is unique within the internal address space 350. The external address values 330 associated with virtual partitions Z-100 and Z-200 (column 320) are identical, but can be translated into unique internal address values 340 based on a combination of the virtual partition identifiers 320 and the external address values 330. For example, if a first ingress packet received at an address translation module includes virtual partition identifier Z-100 (column 320) and external address value A (column 330), external address value A can be replaced based on this table 300 with internal address value G (column 340). If a second ingress packet received at an address translation module includes virtual partition identifier Z-200 (column 320) and external address value A (column 330), external address value A can be replaced based on this table 300 with internal address value I (column 340). As illustrated by this example, the virtual partition identifier 320 was used in combination with the external address value 330 to determine a unique internal address value 340 even though the external address values 330 of both of the ingress packets were the same.

In some embodiments, an internal address value 340 can be translated into an external address value 330 based on only the internal address value 340. In some embodiments, the virtual partition identifier 320 can also be determined based on the internal address value 340. For example, as shown FIG. 3, internal address value K (column 340) can be associated with external address value B (column 330) and virtual partition identifier Z-300 (column 320).

Even if a packet is received at a session exchange device over a first virtual partition and later transmitted from the session exchange device over a second virtual partition different from the first virtual partitions, in some embodiments, the external address value 330 of the packet can be determined and properly defined in the outgoing packet based only the internal address value 340. For example, if a packet having virtual partition identifier Z-300 (column 320) and external address value C (column 330) is received from a network at an address translation module, the external address value C of the packet can be replaced with internal address value L (column 340) by the address translation module. The packet can then be processed at an operating system and/or application of a session exchange device. If the operating system and/or the application modifies the packet such that the packet has a different internal address value H (column 340) and/or a different virtual partition identifier Z-100 (column 320), the appropriate external address value B (column 330) can be determined based on the internal address value H (column 340). In some embodiments, if the virtual partition identifier 320 was not changed by the operating system and/or the application, the address translation module can be configured to replace the virtual partition identifier 320 based on the internal address value 340.

In some embodiments, an address translation module can be configured to create entries such as those illustrated in this table 300, and store them in an address translation database when packets are received at the address translation module via a specified virtual partition. For example, when a packet is received at the address translation module, the address translation module can read the virtual partition identifier 320 and external address value 330 from the packet. Based on, for example, NAT rules, an internal address value 340 can be selected from the internal address space 350 and associated with the combination of the virtual partition identifier 320 and the external address value 330 in an address translation database entry. The database entry can then be used to translate (e.g., determine, replace) the external address values 330 of subsequent packets associated with the virtual partition into the appropriate internal address values 340. The entry in the address translation database can also be used to translate the internal address value 340 of a packet into the external address value 320 before the packet is transmitted from the session exchange device.

In some embodiments, an external address value 330 and/or an internal address value 340 can be determined based on identifier in addition to those shown in table 300. For example, an internal address value 340 can be determined based on a virtual partition identifier 320, an external address value 330, and a realm identifier (not shown) associated with the virtual partition.

Figure 4:
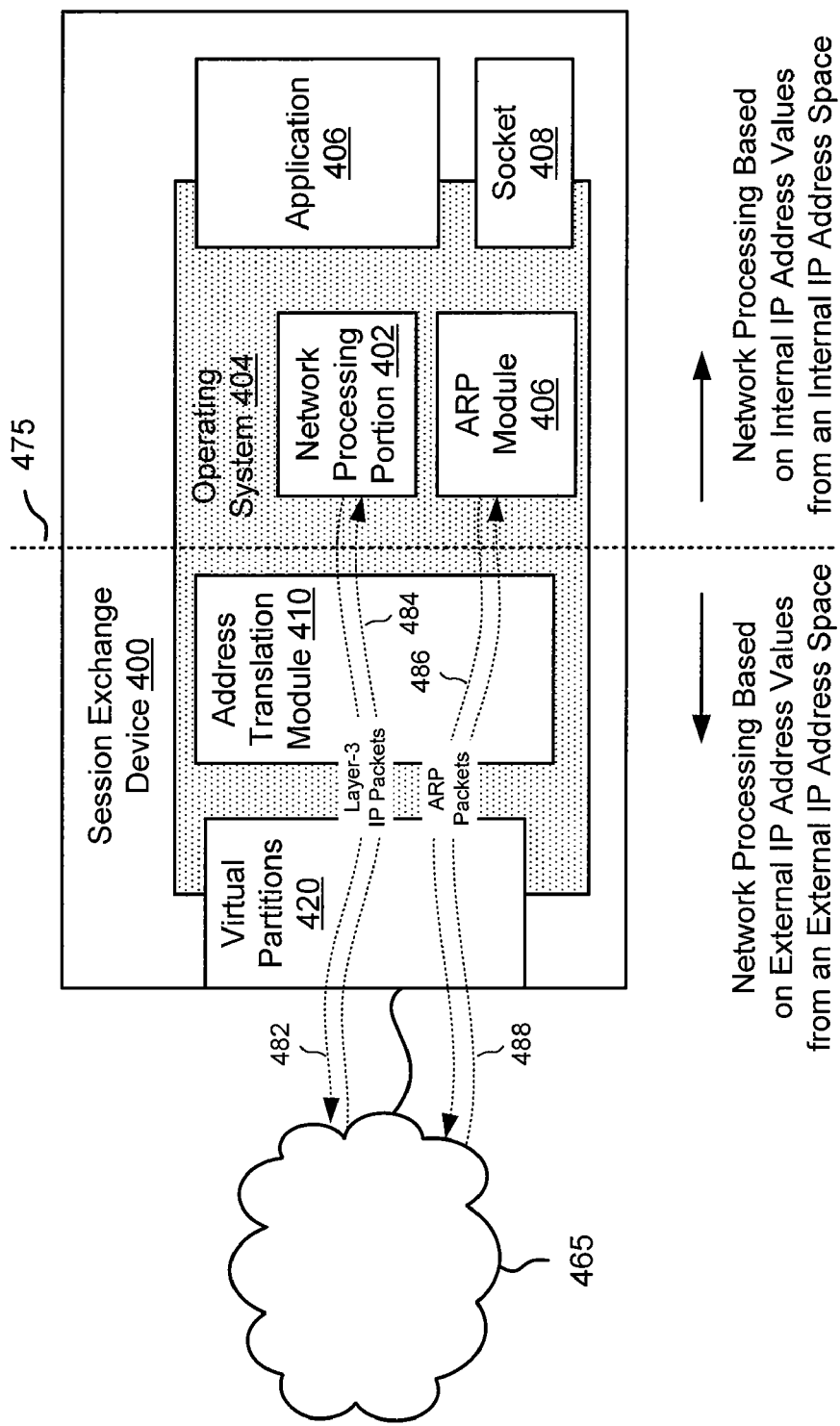
FIG. 4 is a schematic block diagram that illustrates an address translation module of a session exchange device configured to process layer-3 IP packets and/or process address resolution protocol (ARP) packets, according to an embodiment of the invention.

FIG. 4 is a schematic block diagram that illustrates an address translation module 410 of a session exchange device 400 configured to process layer-3 IP packets and/or process ARP packets, according to an embodiment of the invention. The layer-3 IP packets and/or the ARP packets are associated with at least one virtual partition from a group of virtual partitions 420. An ARP packet can be, for example, a packet related to a transport layer of an OSI network (can also be referred to as a data-link layer or as layer-2). A layer-3 IP packet can be, for example, an IP packet with a media content payload. As shown in FIG. 4, the session exchange device 400 is in communication with an IP network 465.

The address translation module 410 is configured to replace an external IP address value of an ingress layer-3 IP packet (line 484) with an internal IP address value and replace an internal IP address value of an egress layer-3 IP packet (line 482) with an external IP address value. The address translation module 410 is also configured to replace an external IP address value of an ingress ARP packet (line 488) with an internal IP address value and replace an internal IP address value of an egress ARP packet (line 486) with an external IP address value. The internal IP address values can be from an internal IP address space. The address translation module 410 can be configured to replace the external IP address values with internal IP address values, and vice versa, so that components/modules to the right of line 475 can perform network-related processing based on internal IP address values, and component/modules to the left of line 475 can perform network-related processing based on external IP address values.

As shown in FIG. 4, the layer-3 IP packets are sent to and from a network processing portion 402 of an operating system 404 of the session exchange device 400. In some embodiments, one or more layer-3 IP packets with internal IP address values can be sent between network processing portion 402 and another portion of the session exchange device 400, such as application 406, for further network-related processing. In some embodiments, a layer-3 IP packet with an internal IP address can be sent between the address translation module 410 and a portion other than the network processing portion 402, such as application 406.

In some embodiments, the network portion 402 can be configured to associate (e.g., bind) a socket 408 associated with the application 406 to one or more internal IP address values from the internal IP address space. The socket 408 can be associated with an internal IP address value so that layer-3 IP packets can be sent to and/or received from the application 406 via the socket 408 based on the internal IP address value. The socket 408 can be associated with the application 406, for example, when the application 406 is executed (e.g., launched) at the session exchange device 400. In some embodiments, an external IP address value associated with a layer-3 IP packet can be replaced with an internal IP address value from an internal IP address space based on NAT rules.

As shown in FIG. 4, the ARP packets are sent to and from an ARP module 406 of the operating system 404 of the session exchange device 400. The ARP module 406 can be configured to associate (e.g., bind) an internal IP address to, for example, a media access control (MAC) address value associated with a component (not shown) of the session exchange device 400. The component can be, for example, a physical network card of the session exchange device 400. For example, an internal IP address value can be associated with a MAC address value within an egress ARP packet (line 486). The egress ARP packet can be defined at the ARP module 406. The egress ARP packet can be, for example, an ARP request or an ARP reply.

In some embodiments, an external IP address value associated with an ARP packet can be replaced with an internal IP address value from an internal IP address space based on ARP rules. In some embodiments, an internal IP address space associated with the layer-3 IP packets can be different than an internal IP address space associated with the ARP packets.

In some embodiments, the address translation module 410 can have a portion (not shown) configured to translate the internal IP address values and/or external IP address values associated with ARP packets. The address translation module 410 can have a different portion (not shown) configured to translate the internal IP address values and/or external IP address values associated with layer-3 IP packets.

Figure 5:
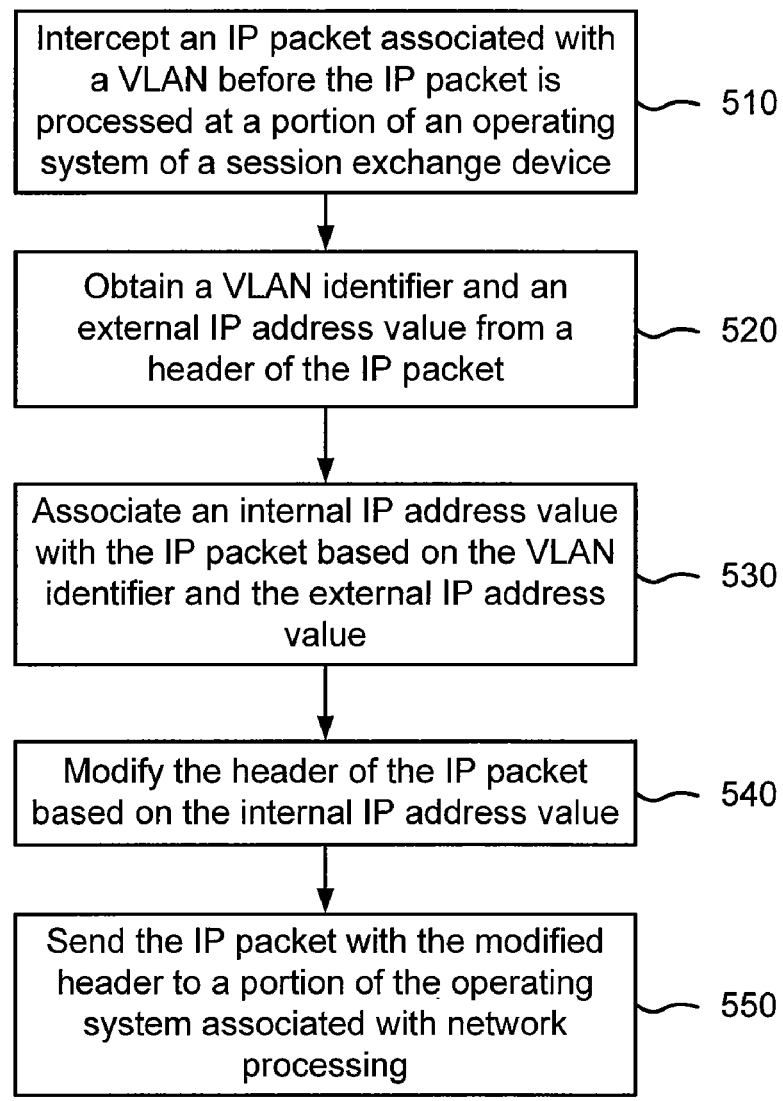
FIG. 5 is a flowchart that illustrates a method for modifying an IP address value within a header of an IP packet before the IP packet is processed at a portion of an operating system of a session exchange device, according to an embodiment of the invention.

FIG. 5 is a flowchart that illustrates a method for modifying an IP address value within a header of an IP packet before the IP packet is processed at a portion of an operating system of a session exchange device, according to an embodiment of the invention. As shown in FIG. 5, an IP packet associated with a VLAN is intercepted before the IP packet is processed at a portion of an operating system of a session exchange device at 510. The IP packet can be associated with a particular realm of the VLAN. The IP packet can be intercepted at, for example, a buffer associated with an input port of the session exchange device.

A VLAN identifier and an external IP address value are obtained (e.g., read, extracted, identified) from a header of the IP packet at 520. In some embodiments, the VLAN identifier can be used to identify a particular realm of the VLAN. The external IP address value can be a public IP address value used to route the IP packet to the VLAN of the session exchange device over, for example, an IP network. In other words, the external IP address value can be an interface IP address value associated with the VLAN.

An internal IP address value is associated with the IP packet based on the VLAN identifier and the external IP address value at 530. The internal IP address value can be selected from an internal IP address space associated with the session exchange device based on NAT rules. In some embodiments, an entry in a database that associates the internal IP address value with the VLAN identifier and/or the external IP address value can be defined.

The header of the IP packet is modified based on the internal IP address value at 540. In some embodiments, the external IP address in the header can be replaced with the internal IP address value. In some embodiments, the internal IP address value of the header is replaced without changing the VLAN identifier in the header of the IP packet.

The IP packet with the modified header is sent to the portion of the operating system associated with network processing at 550. The portion of the operating system can be configured to process the IP packet based on the internal IP address value. For example, in some embodiments, a socket associated with an application executing at the session exchange device can be bound to the internal IP address value.

In some embodiments, the IP packet can be sent to a different portion of the session exchange device, in place of, or in addition to, the portion of the operating system, for network-related processing based on the IP address value. In some embodiments, the method illustrated in FIG. 5 can be used to modify an IP address included in a different portion of an IP packet, such as a payload portion of the IP packet.

Figure 6:
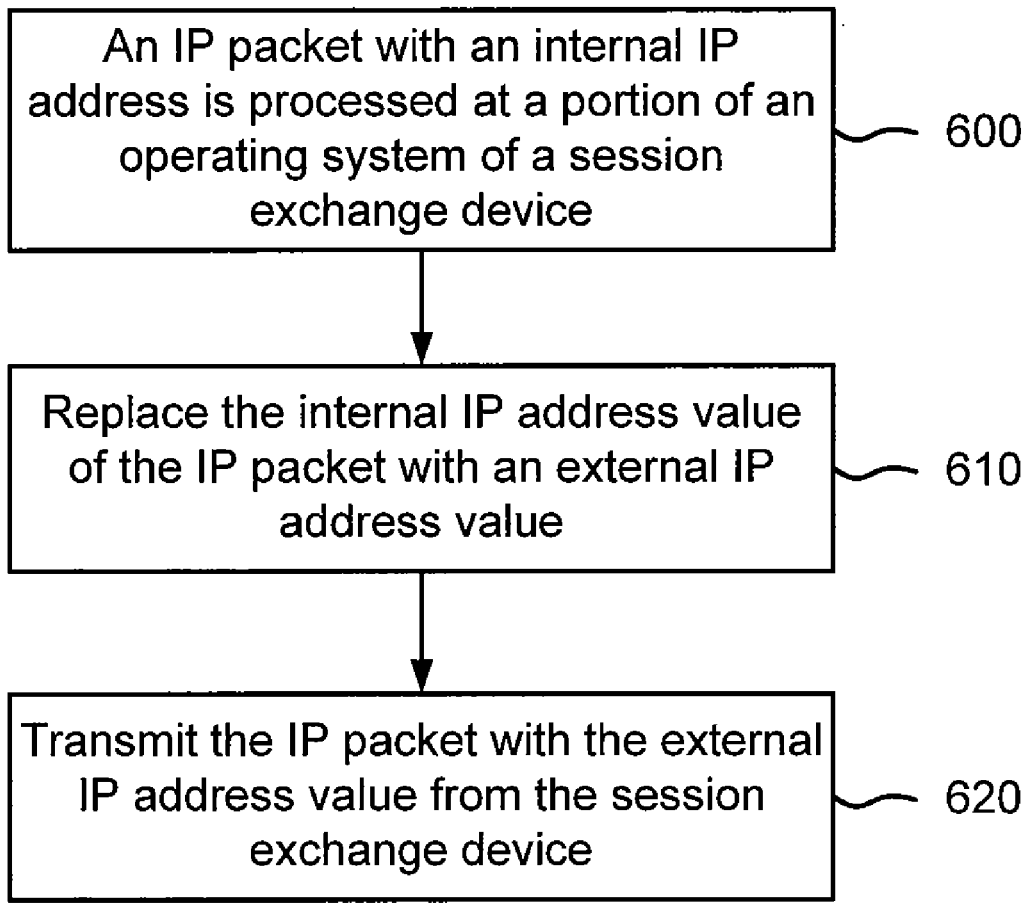
FIG. 6 is a flowchart that illustrates a method for modifying an IP address value of a header of an IP packet before the IP packet is sent from a session exchange device, according to an embodiment of the invention.

FIG. 6 is a flowchart that illustrates a method for modifying an IP address value of a header of an IP packet before the IP packet is sent from a session exchange device, according to an embodiment of the invention. An IP packet with an internal IP address value can be processed at a portion of an operating system of the session exchange device at 600. In some embodiments, the internal IP address value can be included in a header portion of the IP packet. In some embodiments, the portion can be an internal network-processing portion. In some embodiments, the IP packet can be associated with a VLAN defined at the session exchange device.

The internal IP address value of the IP packet can be replaced with an external IP address value at 610, before the IP packet with the external IP address value is transmitted from the session exchange device at 620. In some embodiments, the external IP address value can be determined (e.g., before step 610) by referencing an entry in a database where the external IP address value is associated with an identifier associated with the VLAN and/or the internal IP address value. In some embodiments, the IP packet can be transmitted via a particular VLAN defined at the session exchange device.

Figure 7:
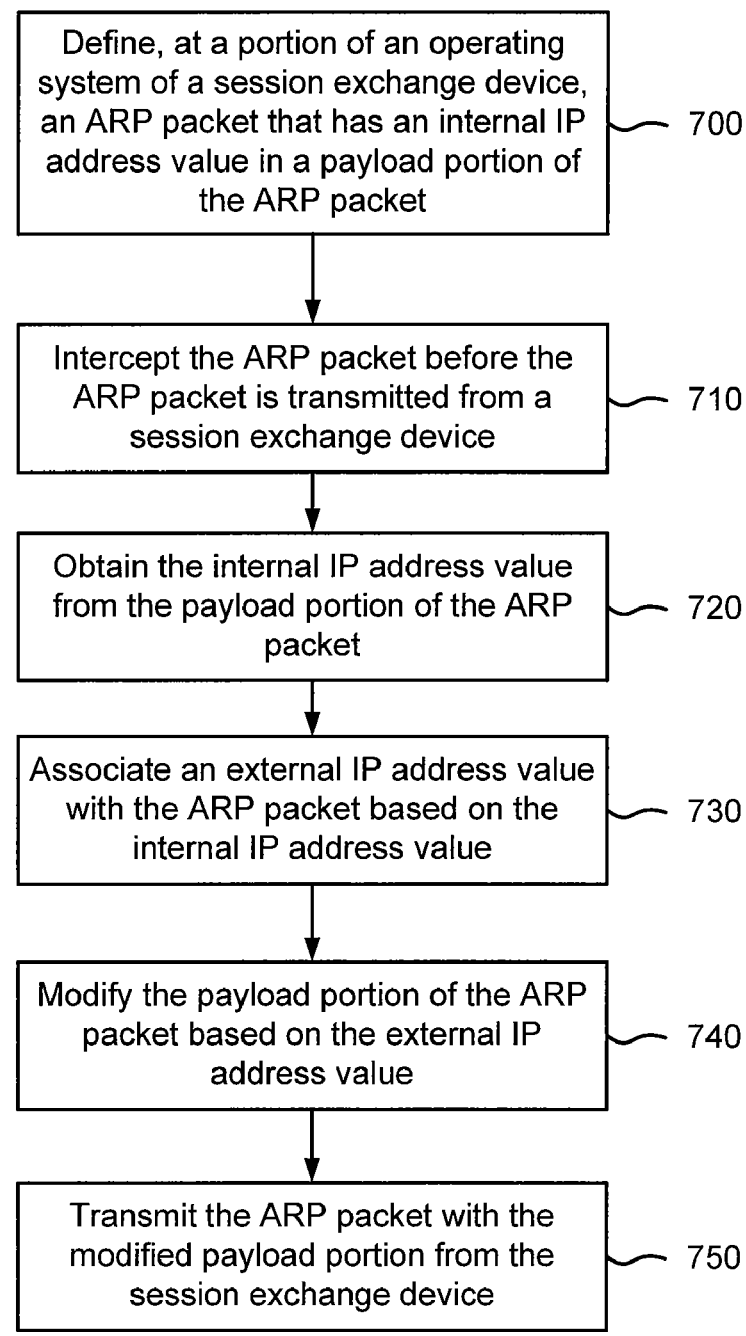
FIG. 7 is a flowchart that illustrates a method for modifying an IP address value within a payload of an ARP packet before the ARP packet is transmitted from a session exchange device, according to an embodiment of the invention.

FIG. 7 is a flowchart that illustrates a method for modifying an IP address value within a payload of an ARP packet before the ARP packet is transmitted from a session exchange device, according to an embodiment of the invention. An ARP packet that has an internal IP address value in a payload portion is defined at a portion of an operating system of a session exchange device at 700. The portion of the operating system can be configured to process ARP packets based on internal IP address values. The internal IP address value can be selected from an internal IP address space associated with the portion of the operating system based on one or more ARP rules.

In some embodiments, the internal IP address value can be associated with (e.g., bound to) a MAC address value of a network component of the session exchange device. The internal IP address value can be a value statically or dynamically assigned to the MAC address value. In some embodiments, the internal IP address value can be mapped to a MAC address value before the ARP packet is defined. In some embodiments, the ARP packet can be defined based on an entry included in an ARP cache.

An ARP packet is intercepted before the ARP packet is transmitted from a session exchange device at 710. The ARP packet can be, for example, an ARP reply or an ARP request. In some embodiments, the ARP packet can be associated with a particular virtual partition (e.g., VLAN) defined at the session exchange device. In some embodiments, the ARP packet can be intercepted at an address translation module associated with the operating system.

The internal IP address value is obtained (e.g., read, extracted, identified) from the payload portion of the ARP packet at 720 and an external IP address value is associated with the ARP packet based on the internal IP address value at 730. In some embodiments, the external IP address value can be determined by referencing an entry in a database where the external IP address value is associated with the internal IP address value. If the ARP packet is associated with a virtual partition defined at the session exchange device (e.g., VLAN), the external IP address value can be determined by referencing an entry in a database where the external IP address value is associated with a virtual partition identifier and/or the internal IP address value.

The payload portion of the ARP packet is modified based on the external IP address value at 740. In some embodiments, the external IP address in the payload portion can be replaced with the internal IP address value. In some embodiments, the internal IP address value of the header is replaced without changing the VLAN identifier in the header of the IP packet. After the ARP packet has been modified at 740, the ARP packet with the modified payload portion is transmitted from the session exchange device at 750.

In some embodiments, an ingress ARP packet that includes an external IP address value (e.g., included in a payload portion) can be intercepted at the session exchange device. The external IP address value of the ARP packet can be replaced with an internal IP address value before, for example, being processing at an internal network-processing portion of an operating system of the session exchange device. The external IP address value can be replaced with the internal IP address value so that the portion of the operating system can process the ARP packet based on the internal IP address value rather than based on the external IP address value.

Some embodiments relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signals; and hardware devices that are specially configured to store and execute program code, such as Application-Specific Integrated Circuits (ASICs), Programmable Logic Devices (PLDs), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus for translating an IP address of a packet associated with a session exchange device are described. While various embodiments have been described above, it should be understood that they have been presented by way of example only, and various changes in form and details may be made. For example, in some embodiments, an address translation module can be configured to translate an external address of a packet and/or an internal address of a packet that has a different format than an IP address.

What is claimed is:

1. A method, comprising:
   receiving an internet protocol (IP) packet associated with one of a plurality of virtual partitions of a session exchange device defined at the session exchange device, the IP packet being routed over a media over internet protocol (MoIP) network associated with the session exchange device based on an external IP address value of the IP packet, wherein the external IP address value is used to route packets associated with at least two or more of the plurality of virtual partitions of the session exchange device over the MoIP network to the two or more virtual partitions;
   replacing, after the receiving, the external IP address value of the IP packet with an internal IP address value based on an identifier associated with the one virtual partition and based on the external IP address value;
   sending the IP packet to a portion of an operating system of the session exchange device associated with network processing; and
   replacing, after the sending, the internal IP address value of the IP packet with the external IP address value before the IP packet is transmitted from the session exchange device.

2. The method of claim 1, further comprising:
   routing the IP packet to an application based on the internal IP address value, the application executing at the session exchange device.

3. The method of claim 1, wherein the one virtual partition is a first virtual partition, the external IP address value is from an IP address space associated with the first virtual partition, the IP address space associated with the first virtual partition having a portion corresponding to an IP address space associated with a second virtual partition defined at the session exchange device.

4. The method of claim 1, wherein the replacing the internal IP address value is based on the external IP address value.

5. The method of claim 1, wherein the internal IP address value is associated with a socket of an application executing at the session exchange device.

6. The method of claim 1, wherein the external IP address value is included in a layer-3 header of the IP packet.

7. The method of claim 1, wherein the IP packet is a first IP packet, the method further comprising:
   receiving a second IP packet associated with a transport layer of the MoIP network from the portion of the operating system, the second IP packet having the internal IP address value; and
   replacing the internal IP address value of the second IP packet with the external IP address value before the second IP packet is transmitted from the session exchange device.

8. The method of claim 1, wherein the internal IP address value is selected from a private IP address space having a plurality of IP address values that are unroutable over the MoIP network.

9. A method, comprising:
   receiving at an address translation module of a session exchange device having a plurality of virtual partitions, an address resolution protocol (ARP) packet defined at an operating system of the session exchange device, the ARP packet having an internal Internet protocol (IP) address value associated with a virtual partition defined at the session exchange device, the address translation module being associated with the operating system; and
   replacing, at the address translation module, the internal IP address value of the ARP packet with an external IP address value before the ARP packet is transmitted from the session exchange device over a media over internet protocol (MoIP) network, wherein the external IP address value is used to route packets associated with at least of two or more of the plurality of virtual partitions of the session exchange device over the MoIP network to the two or more virtual partitions.

10. The method of claim 9, wherein the virtual partition is a first virtual partition, the external IP address value is from an IP address space associated with the first virtual partition, the IP address space associated with the first virtual partition having a portion corresponding to an IP address space associated with a second virtual partition defined at the session exchange device.

11. The method of claim 9, wherein the virtual partition is a first virtual partition, the external IP address value is associated with the first virtual partition and associated with a second virtual partition defined at the session exchange device, the internal IP address value is uniquely associated with the first virtual partition.

12. The method of claim 9, wherein the ARP packet is associated with a transport layer of the MoIP network, the internal IP address value is included in a payload of the ARP packet.

13. The method of claim 9, wherein the virtual partition is associated with a virtual local area network having a plurality of realms, the replacing includes replacing at the address translation module.

14. The method of claim 9, wherein the internal IP address value is associated with a media access control (MAC) address of a component of the session exchange device, the external IP address value is associated with the MAC address when the internal IP address value is replaced with the external IP address value.

15. A method, comprising:
   receiving a first internet protocol (IP) packet associated with a first virtual partition of a plurality of virtual partitions of a session exchange device defined at the session exchange device, the first virtual partition being associated with a first IP address space;
   receiving a second IP packet associated with a second virtual partition of the plurality of virtual partitions of the session exchange device, the second virtual partition being associated with a second IP address space having a portion corresponding with the first IP address space, wherein the first and second virtual partitions include a same IP address value that is used to route the first or second packets associated with the first or the second virtual partition over a media over internet protocol (MoIP) network associated with the session exchange device to the first or the second virtual partition; and
   modifying the first IP packet associated with the first virtual partition such that the first IP packet associated with the first virtual partition has an IP address value from a third IP address space different from the portion of the second IP address space.

16. The method of claim 15, wherein each IP address value from the third IP address space is different than at least one of each IP address value from the first IP address space or each IP address value from the second IP address space.

17. The method of claim 15, further comprising:
   sending the first IP packet associated with the first virtual partition to an operating system of the session exchange device, the modifying includes modifying at a first address translation module before the sending; and receiving, after the sending, the first IP packet associated with the first virtual partition at a second address translation module associated with an application of the session exchange device.

18. The method of claim 15, further comprising:
sending the first IP packet associated with the first virtual partition to an operating system of the session exchange device, the modifying includes modifying at a first address translation module before the sending; and
replacing, after the sending, the IP address value from the third IP address space with an IP address value from the first IP address space at a second address translation module associated with an application of the session exchange device.

19. The method of claim 15, wherein the third IP address space is used locally at the session exchange device.

20. The method of claim 15, further comprising:
modifying the first IP packet associated with the first virtual partition such that the first IP packet associated with the first virtual partition has an IP address value from the first IP address space before the IP packet associated with the first virtual partition is transmitted from the session exchange device over the MoIP network to an entity associated with the MoIP network.

* * * * *